Sept. 14, 1943.  P. S. DICKEY  2,329,459
GAS ANALYSIS METHOD AND APPARATUS
Filed March 19, 1940  2 Sheets-Sheet 1
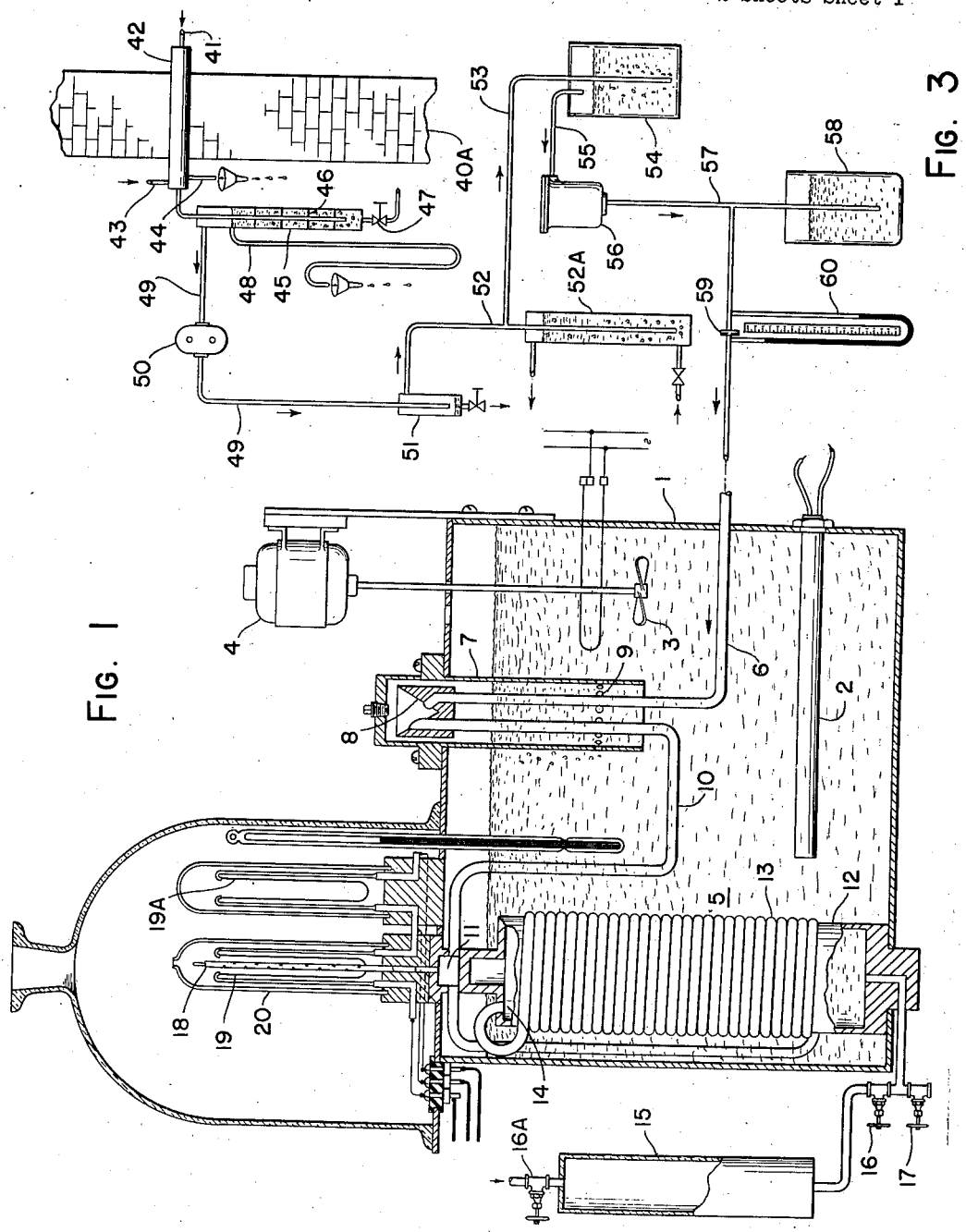
Inventor
PAUL S. DICKEY
By Raymond D. Junkins
Attorney Sept. 14, 1943.                P. S. DICKEY                2,329,459
                    GAS ANALYSIS METHOD AND APPARATUS
                    Filed March 19, 1940          2 Sheets-Sheet 2
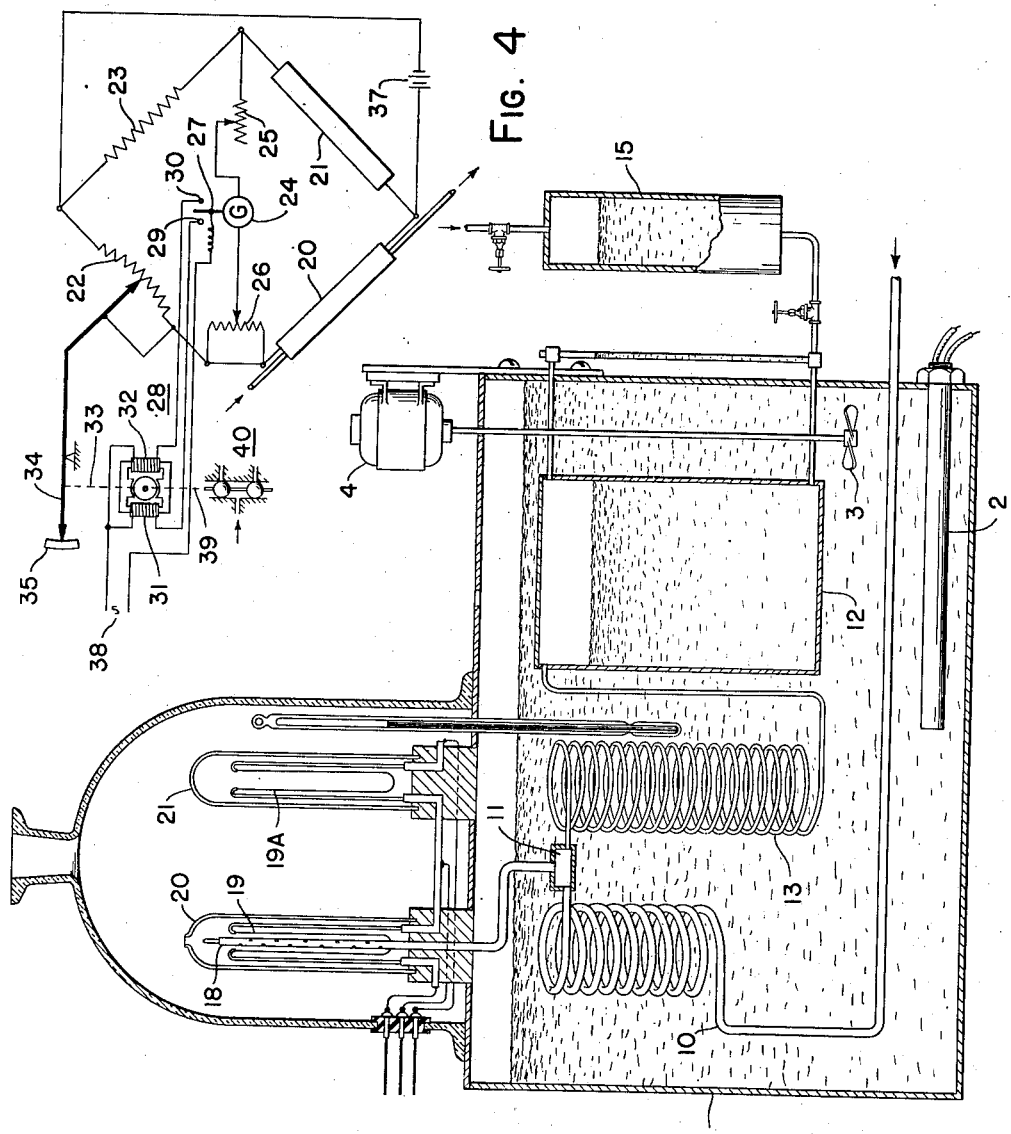
Inventor
PAUL S. DICKEY
By Raymond D. Junkins
                                                    Attorney Patented Sept. 14, 1943

2,329,459

UNITED STATES PATENT OFFICE 2,329,459

GAS ANALYSIS METHOD AND APPARATUS

Paul S. Dickey, Shaker Heights, Ohio, assignor to Bailey Meter Company, a corporation of Delaware Application March 19, 1940, Serial No. 324,810

5 Claims. (Cl. 23—232)

This invention relates to a method and apparatus for analyzing gaseous mixtures to quantitatively determine the percentage therein of one of the constituent gases. It is particularly directed to the determination of the percentage of free oxygen in the combustion gases exhausting from internal combustion engines or leaving furnaces of various types.

The invention finds more particular application in that type of gas analyzers in which the gas to be analyzed is mixed with a fuel and passed in contact with a catalyst wire forming one leg of a Wheatstone bridge wherein the catalyst wire acts to assist in burning the free oxygen of the gaseous sample and at the same time the catalyst wire is used to measure the temperature change due to the combustion of the free oxygen in the gas which comes into contact with the catalyst wire. The change in temperature of the catalyst wire, due to combustion thereon, acts to change the resistance of the wire to current flow. The catalyst wire is mounted in a galvanometer circuit so that the change of resistance to the flow of current through the wire due to its temperature change provides a voltage in the galvanometer circuit to measure the temperature change, and thus to measure the percentage of free oxygen in the flowing sample.

This general type of gas analyzer is old and well known both for determining the percentage of free oxygen or the percentage of combustible constituents in such a gaseous sample. Furthermore, it is known that various types of fuels may be used in such a method and apparatus for consuming the free oxygen of the sample. Of such fuels hydrogen is an example of gaseous fuel, while methanol is an example of liquid fuels.

There are many advantages to be attained through the use of a liquid fuel, of which methanol is an example, including the ease of handling and storage, the small space required both interiorly of and externally of the analyzer mechanism per se. When it is appreciated that a given volume of such a liquid fuel will occupy approximately seventeen hundred times that volume in its gaseous form at or near atmospheric pressure, it will be understood that a relatively small volume of such a liquid fuel will keep such an analyzer in continuous operation for a period of weeks or months without replenishment. In actual operation and servicing of equipment this has a decided advantage.

In order that such an analyzing method and apparatus be consistent, sensitive, and accurate, it is necessary that the gaseous sample and the fuel supplied for the burning thereof be continuously proportioned within close limits. One difficulty that has been experienced in the past in the use of liquid fuels has been the constant and uniform vaporization of such a fuel, the control of its temperature, pressure, rate of flow, etc., so that the resulting vapor fuel supplied to be mixed with the flowing gas sample is at a uniform rate and at uniform conditions of temperature, pressure, etc.

It is a particular object of my invention to so control the vaporization of a liquid fuel, such as methanol, that these difficulties are overcome and that the resulting gaseous or vapor fuel is supplied in predetermined proportion continuously to the flow of sample gas which is to be analyzed.

In my apparatus and method I speak generally of a "fuel generator" by which I mean that apparatus necessary to convert a liquid fuel into its gaseous or vapor form and supply it to the chamber wherein it is mixed with the gaseous sample under proper conditions of flow, etc.

These and other objects will become apparent by reference to the following description and drawings, where:

Fig. 1 is a diagrammatic view of an apparatus embodying my generator.

Fig. 2 is a modification of Fig. 1.

Fig. 3 is a representation of a gas sample procuring arrangement.

Fig. 4 represents the Wheatstone bridge circuit utilized in my preferred arrangements.

Referring now to Fig. 1, I show therein a container 1 substantially filled with water or with a low vapor pressure fluid such as dibutyl phthalate and which fluid is desirably maintained at a substantially uniform temperature by means of a thermostatically controlled heater 2. The temperature of the fluid is maintained uniform throughout the chamber 1 by a stirrer 3 driven by an externally mounted motor 4. The purpose of the uniformly heated liquid within the container 1 is to vaporize the liquid fuel and to assure that the vapor fuel and the gaseous sample are brought to a uniform temperature before they are mixed and to prevent ambient temperature variations from affecting either the fuel generator, the vapor emerging therefrom, or the gas sample to be analyzed.

Water is preferably used as the liquid within the chamber 1 and is maintained at its boiling temperature. This may probably be more readily accomplished at atmospheric pressure than the heating of some fluid having a decidedly different boiling temperature at atmospheric pressure than has water. If some other fluid, such as dibutyl phthalate, is used, then a temperature below its boiling point may be maintained but at the expense of requiring a closer temperature control by the heater and thermostatic element. However, a disadvantage of water boiling at atmospheric pressure is that the vaporization of the water will gradually diminish the supply thereof.

It will be seen however that the invention is by no means limited to the type of fluid used in the container 1 to maintain constant temperature conditions, and that the expedients for maintaining such a liquid at uniform temperature are well known and many variations may be employed. It is only necessary in connection with my invention that some predetermined substantially uniform temperature be maintained for the fuel generator, as well as for the vapor fuel supply and the gas supply prior to their entering the mixing chamber.

As indicated in Fig. 1, a measured sample of gas flows into the container 1 through a pipe 6, thence flows through a pressure determining device 7 which contains a velocity stifling cone 8. The pressure is determined by the submergence of the cylinder 7 in the fluid of the container as excess gas may escape through the numerous orifices 9 near the base of the cylinder, when the fluid is at approximately their level, to bubble upwardly and to the atmosphere. The pressure of the flowing gas sample passing from the chamber 7 through the pipe 10 is determined by the head of liquid in the chamber 7 through which the excess gas must pass to leave the orifices 9. In other words, by the number of inches in vertical elevation between the orifices 9 and the level of the liquid in the container 1. The measured flowing sample of gas passing through the pipe 10, submerged in the temperature control fluid, enters a mixing chamber 11 above the generator 5.

To this uniform flow of sample gas I add a uniform supply of vapor fuel. A particular feature of my invention is in the regulation of the supply of vapor fuel to the mixing chamber 11. If the liquid within the container 1 is water, then one preferred arrangement is such that at boiling water temperature the methanol liquid fuel has a vapor pressure of about 35 lbs. per square inch within the generator cylinder 12 and of this vapor pressure I absorb by means of a lengthy capillary tube all of the pressure in excess over that which I desire the vapor fuel to have as it enters the mixing chamber 11. I thus am able to maintain a uniform vaporization of the liquid fuel and, by means of the capillary, to very closely regulate the pressure and rate of flow of the vapor fuel before it joins the flowing gas sample.

There are many advantages to such a system over a vapor generator directly heated and from which the vapor fuel passes either by evaporation or otherwise. In the latter type of vaporizer an accurate level control is necessary. Furthermore, surface tension pulsation and irregularity of supply by straight boiling in an evaporator cause many inaccuracies in the analyzer. These troubles are completely avoided by the present arrangement.

The generator 5 comprises a cylinder 12 which is substantially filled with a liquid fuel. To the cylinder is attached the capillary 13 preferably wound around the cylinder and connecting to its interior near the top as at 14. The length of the capillary and its size determines the final desired pressure and rate of flow of the vapor fuel to be admixed with the gas sample. The pressure within the generator will remain constant providing the temperature of the heating fluid be kept constant, for it is a function of the temperature only. As will be observed from Fig. 1 the capillary joining the top of the cylinder 12 at 14 is wound downwardly around the cylinder and from near the bottom of the cylinder projects upwardly through the heating fluid to enter the mixing chamber 11. The capillary might equally as well be located on the interior of the cylinder if so desired. Inasmuch as the heat from the liquid within the container 1 must pass through the capillary 13 to vaporize the liquid fuel within the container 12, there will not be as great a tendency toward superheating the vapor fuel in the capillary 13 as is the case in the embodiment illustrated in Fig. 2. Various combinations of such arrangements may be used to attain the desired final condition of the vapor fuel entering the mixing chamber 11.

As is stated, the amount of fuel vapor produced depends solely upon temperature applied to the generator and the throttling of the capillary. Thus the temperature of the liquid in the container 1 serves the additional purpose of providing heat to the generator for vaporization of the liquid fuel therein. Since temperature determines the vapor pressure within the generating cylinder 12 the depth of liquid fuel therein is immaterial. Therefore, I may charge the cylinder periodically and the frequency of charge depends upon the size. I show a liquid fuel supply 15, which for convenience is located near the container 1 and which may be of glass or provided with a gage glass to indicate quantity of liquid charged into the generator. I further show the necessary valves 16 and 16A to be used for filling the container 15 and for filling the generator cylinder 12, and a valve 17 for draining the system.

The correct flows of fuel vapor and gaseous mixture to be analyzed, both at the same temperature, mix in a small chamber 11 and pass upwardly into a diffusing tube 18, which through its plurality of spaced orifices spreads the mixture evenly over the adjacent suspended catalyst wire 19, whereon the mixture is burned. The burning of the mixture affects the resistance of the catalyst, which forms a part of the Wheatstone bridge circuit, and this variation in resistance is indicative of free oxygen content of the gaseous sample.

In Fig. 2 I show another variation wherein I separate the throttling capillary 13 from the liquid fuel vaporizer 12. Both the vaporizer 12 and the throttling capillary 13 are however submerged in the heating liquid contained in the tank 1, as is also a throttling capillary 10 through which the sample of gas to be analyzed passes. It will be quite apparent to those skilled in the art that the bore and length of the capillaries 10 and 13 may be properly designed and proportioned that the flow of gas to be analyzed and the flow of vapor fuel will each enter the mixing chamber 11 at desired rate and condition as to temperature, pressure, etc. It will be clearly understood that various combinations and arrangements of the vaporizer and capillary may be employed. For example, a part only of the capillary 13 may be wound around the vaporizer or may be submerged in the interior of the vaporizer. Such variations in arrangement serve to produce a desired condition of the vapor fuel entering the mixing chamber 11.

As stated, the burning of the mixture occurs on catalyst 19, which forms a part of a Wheatstone bridge circuit shown in detail in Fig. 4. The catalyst wire 19 is contained in an enclosure 20 through which the gas mixture flows, as indicated by the arrows. A similar catalyst 19A is suspended in an air tight enclosure 21 which serves as a comparison leg in the bridge circuit. The other two legs of the bridge contain fixed resistances 22, 23. In the conjugate conductor of the bridge are located a galvanometer 24 and adjustable calibrating resistances 25 and 26. The galvanometer pointer 27 forms part of a separate circuit including a reversible motor 28, which by its rotation indicates the galvanometer division, and results in a rebalancing of the bridge circuit.

In operation, with a gaseous mixture flowing through the detector chamber 20 any chemical reaction of the mixture will change the initial electrical resistance of the catalyst 19, which change is immediately indicated by the deflection of the galvanometer 24. The galvanometer pointer 27 when deflected will contact either terminal 29 or 30, energizing a respective field 31 or 32 and causing the motor 28 to rotate in a desired direction. The motor 28 in its rotation, through linkage 33 diagrammatically shown, moves an index arm 34, relative an index 35, an amount proportional to the extent and time of galvanometer deflection and to the intensity of the chemical reaction occurring in the detector chamber 20. At the same time the arm 34 will also cause movement of a contact arm along the resistance 22 for rebalancing the bridge. A battery 37 provides a constant current source for the bridge circuit, while an alternating current source 38 provides power for the motor 28. These current sources are not limitations, but for example, and other well known expedients may be utilized.

It may be desirable to control the combustion of a furnace from the knowledge obtained through my apparatus, and to this end I provide the linkage 39 by which the motor 28 positions an air loading pilot valve 40 of the type described and claimed in the patent to Clarence Johnson No. 2,054,464. A positioning of the stem of the pilot valve 40 produces an air loading pressure proportional to the free oxygen content of the gaseous mixture being analyzed. Such an air loading pressure may then be utilized in the positioning or control of a damper or regulator of air and/or fuel.

Gaseous mixtures to be analyzed must be thoroughly cleaned of suspended matter, moisture, and other injurious material, such for example as sulphurous compounds. Coal burning furnaces in particular have exhaust gases of combustion containing ash and injurious gases. In Fig. 3, by way of example, I illustrate preferred apparatus for filtering and cleaning gases prior to analysis by my apparatus.

I show in Fig. 3 a section of furnace stack 40A tapped at a desirable location and from which are drawn waste gases through an intake pipe 41, preferably surrounded by a water cooling jacket 42 having a source of cooling water 43 and discharge 44. The gaseous mixture passes to a cylinder 45 containing a number of baffle plates 46 for segregating heavy materials and to disperse the gas in its upward flow through a cleaning fluid, such as water. Cylinder 45 has also a drain valve 47 at its bottom and an overflow conduit 48 adjacent its top. The ascending gas is drawn off through the conduit 49 by means of a positive displacement pump 50. The pipe 49 terminates in a well 51 wherein it drops whatever oil and other material the gas may contain after passing through pump 50.

From the well 51 the gas passes through pipes 52, 53 through another washer 54. A T-connection of pipes 52, 53 diverts excess gas through a pressure determining container 52A, from whence it bubbles to the atmosphere. The washers 45 and 54 further cleanse the gas of suspended matter, absorb sulphur dioxide gas, and otherwise clean the flowing sample.

The gas flowing from the washer 54 is further cleansed of any suspended matter by means of a filter 56 which may be of felt, porous stone, or of any other material capable of stopping and holding small suspended material. From the filter 56 a gas sample flows through pipe 57 having a T-connection, one end terminating in a second pressure determining open container 58, and the other end leading to the intake pipe 6, previously mentioned. Before joining the intake pipe 6 the gas flows through an orifice 59 which further restricts the flow. I may also obtain an indicated head adjustment, through the agency of manometer 60, by varying the level of the water in the overflow container 58.

While I have illustrated and described preferred embodiments of my invention, it is to be understood that the invention is susceptible of many modifications and substitutes and that I am to be limited only by the claims in view of prior art.

What I claim as new, and desire to secure by Letters Patent of the United States, is:

1. In a gas analyzer wherein a vapor fuel is added to a test gas to effect a chemical reaction and where the heat of such reaction is a measure of a gas constituent, a test gas and vapor supply means comprising in combination a tank, a heat transferring fluid in said tank, heating means for said fluid, temperature control means for said heating means, a fuel vapor generator, a mixing chamber for the gas and fuel vapor, a conduit including at least an appreciable length of capillary dimensions leading from said mixing chamber and adapted to connect with the supply of test gas for limiting the flow and pressure of the test gas to said mixing chamber, a conduit including at least an appreciable length of capillary dimensions connecting said fuel vapor generator and said mixing chamber for limiting the fuel vapor pressure and outflow, said respective conduit lengths of capillary dimensions and said mixing chamber being positioned in said heat transferring fluid in said tank, and a detector means having a part in the path of flow of the mixture from the mixing chamber indicating the intensity of the reaction of said mixture.

2. The method of generating controlled quantities of fuel vapor for a gas analysis apparatus comprising, heating a stored supply of liquid fuel, effecting a predetermined vapor pressure of said fuel by controlling the heating thereof, and passing said generated fuel vapor through a capillary tube resistance for determining the flow and pressure of said vapor to be admixed to a gas sample.

3. In a gas analyzer, in combination, means supplying a continuous measured flow of gas to be analyzed, capillary tube means supplying and limiting the pressure and flow of a vapor fuel to desired values for combining with a constituent of the gas sample, a mixing chamber for said flows, said means supplying gas to be analyzed and said capillary tube means leading to said mixing chamber, and means including a catalytically active element communicating with the mixing chamber to which the resultant gas-fuel flow passes from said mixing chamber.

4. In a gas analyzer having an analyzing element, in combination, means for vaporizing a liquid fuel which combines with a constituent of the gas to be analyzed comprising, a container of liquid fuel, constant temperature control means continuously vaporizing said liquid fuel, and a capillary tube through which the resultant vapor fuel passes to the analyzing element, said capillary tube limiting the flow and pressure of the vapor fuel to desired values.

5. The combination of claim 4 in which the capillary is wound around the outside of said container.

PAUL S. DICKEY.